United States Patent
Garg

(10) Patent No.: US 9,779,259 B2
(45) Date of Patent: Oct. 3, 2017

(54) SYSTEM AND METHOD FOR APPLICATION SPECIFIC LOCKING

(71) Applicant: 8318808 Canada Inc., Toronto (CA)

(72) Inventor: Neeraj Garg, Milton (CA)

(73) Assignee: 8318808 Canada Inc., Milton (CA)

( * ) Notice: Subject to any disclaimer, the term of this patent is extended or adjusted under 35 U.S.C. 154(b) by 903 days.

(21) Appl. No.: 13/955,184

(22) Filed: Jul. 31, 2013

(65) Prior Publication Data
US 2015/0040209 A1    Feb. 5, 2015

(51) Int. Cl.
*G06F 21/62* (2013.01)
*G06F 21/31* (2013.01)

(52) U.S. Cl.
CPC .......... *G06F 21/6209* (2013.01); *G06F 21/31* (2013.01); *G06F 2221/2149* (2013.01)

(58) Field of Classification Search
CPC ................ G06F 21/31; G06F 21/6209; G06F 2221/2149
See application file for complete search history.

(56) References Cited

U.S. PATENT DOCUMENTS

| 9,076,008 | B1* | 7/2015 | Moy | G06F 21/60 |
| 2013/0254660 | A1* | 9/2013 | Fujioka | A63F 13/12 |
| | | | | 715/707 |
| 2014/0208225 | A1* | 7/2014 | Anand | G06F 21/31 |
| | | | | 715/741 |
| 2014/0344951 | A1* | 11/2014 | Brewer | G06F 3/0488 |
| | | | | 726/28 |

OTHER PUBLICATIONS

Nickinson, How to use Android 4.3's 'Restricted Profile' feature, Jul. 21, 2016, Android Central.*

* cited by examiner

*Primary Examiner* — Minh Dinh
(74) *Attorney, Agent, or Firm* — Anil Bhole; Bhole IP Law

(57) ABSTRACT

An unlocking application limits access to a computer application on a computing device. The unlocking application is configurable with at least one unlocking command comprising a sequence of inputs received by input devices of the computing device. The unlocking application limits access to at least one of the computer applications by requiring a user of the computing device to provide the at least one unlocking command using the input devices to access the at least one computer application.

16 Claims, 2 Drawing Sheets

SYSTEM AND METHOD FOR APPLICATION SPECIFIC LOCKING

TECHNICAL FIELD

The following relates generally to user access on computing devices and more specifically to application specific locking on such devices.

BACKGROUND

Touchscreen devices are becoming ubiquitous. These devices include smartphones, tablets and desktop and laptop computers. Anecdotal evidence indicates that touchscreen devices enable increased usage of computer applications by children, and particularly very young children. Examples of these applications are computer games.

Further anecdotal evidence indicates that several device owners leave the devices with their children for extended periods of time, during which time children might accidentally navigate away from the specific application with which they are supposed to be interacting, and access some other application. Sometimes, the other application enables the child to make a purchase. There have been examples of device owners incurring substantial invoices for purchases accidentally made by their children. Alternatively, even if the child does not cause any negative impact, they may have navigated away from the specific application and wish to re-access that application but do not have the knowledge to do so.

The above example is just one example where the owner of the device must implicitly trust a guest user of the device who presumes to use the device to access one or more specific applications, and where the owner presumes the guest user would have no need to access other applications or other data on the device.

In case of children, they may exit the specified application accidentally. Whereas in case of guests, the use could be to protect the information while the device is being "temporarily loaned" by the owner of the device. In both cases, the desire to protect the information remains.

Traditional methods of application lock existing by rebooting or going to a special screen to unlock the device are limiting and cumbersome. These option also limit the user experience as a user might accidentally reach the unlock screen, and hinder the experience associated with current application.

It is an object of the following to obviate or mitigate at least one of the foregoing disadvantages.

SUMMARY

In one aspect, a system for limiting access to a computer application on a computing device is provided, the system comprising: (a) a processor; (b) one or more input devices; and (c) a memory linked to the processor, the memory having computer executable instructions stored thereupon which when executed by the processor cause the processor to execute: (i) an operating system; (ii) one or more computer applications; and (iii) an unlocking application, the unlocking application being configurable with at least one unlocking command comprising a sequence of inputs received by the input devices, the unlocking application limiting access to at least one of the computer applications by requiring a user of the computing device to provide the at least one unlocking command using the input devices to access the at least one computer application.

In another aspect, a method for limiting access to a computer application on a computing device is provided, the method comprising enabling a user to define at least one unlocking command comprising a sequence of inputs received by one or more input devices of the computing device, the unlocking command limiting access to one or more computer applications of the computing device by requiring a user of the computing device to provide the at least one unlocking command using the input devices to access the at least one computer application.

BRIEF DESCRIPTION OF THE DRAWINGS

The features of the invention will become more apparent in the following detailed description in which reference is made to the appended drawings wherein.

DETAILED DESCRIPTION

Figure 1:
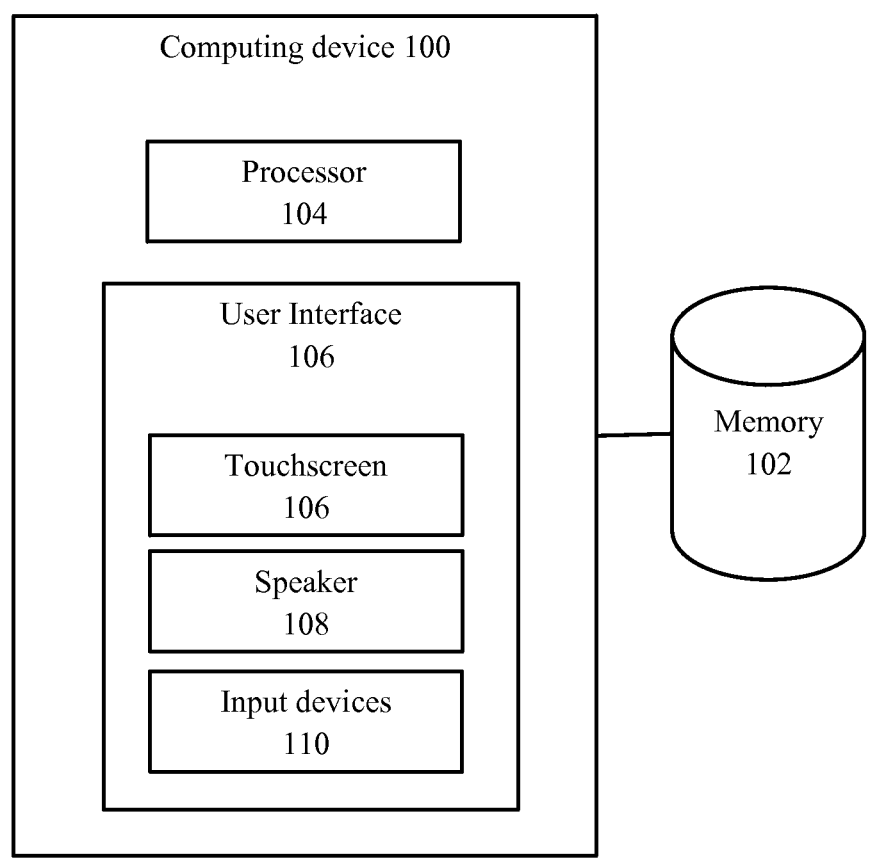
FIG. 1 is an architecture diagram of a system for application specific locking.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media.

The following provides a system and method for application specific locking. In an exemplary embodiment, the application specific locking is provided for locking a touchscreen device to one or more specific applications. A preconfigured unlocking command is provided to access specified applications and functions of the touchscreen device. It will be appreciated, however, that the following applies equally to non-touchscreen devices or hybrid devices that enable a user to provide the preconfigured unlocking command.

An unlocking application limits access to a computer application on a computing device. The unlocking application is configurable with at least one unlocking command comprising a sequence of inputs received by input devices of the computing device. The unlocking application limits access to at least one of the computer applications by requiring a user of the computing device to provide the at least one unlocking command using the input devices to access the at least one computer application.

Referring now to FIG. 1, a computing device 100 comprises or is linked to a user interface 106, a memory 102 and a processor 104. The memory has instructions providing computer programs stored thereupon. The processor is linked to the memory and executes the computer program by the instructions. The computer programs may comprise an operating system, one or more user applications and an unlocking application.

Aspects of the various computer programs may comprise outputting information to the user via the user interface. The output may be provided by a display 106 of the user interface or a speaker 108 of the user interface. The user interface also comprises input devices 110, comprising for example physical buttons and switches, virtual buttons (including a virtual keyboard) (for example, provided by the display if a touchscreen interface), a camera, microphone, accelerometer, gyroscope, or any other means by which a user can provide a command to the device.

Figure 2:
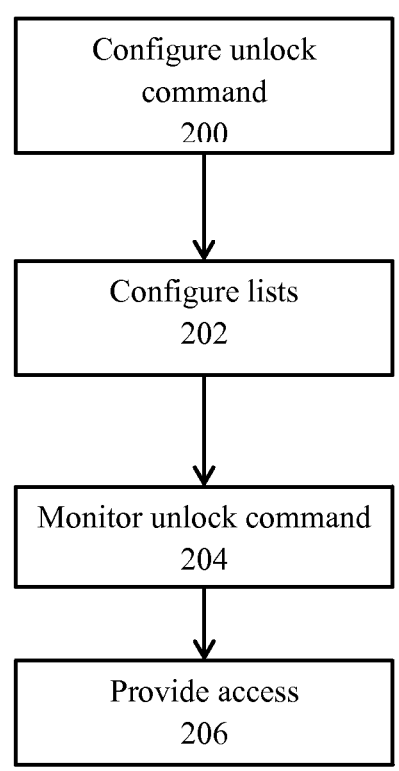
FIG. 2 is a flowchart depicting a method for application specific locking.

Referring now to FIG. 2, in an embodiment, the unlocking application enables the execution of unlocking command, which is an operating system-level command configured by a user that is an owner or administrator (hereinafter "owner") of a device. In block 200, the owner may configure one or more unlocking commands enabling users of the device to access various applications and/or data stored thereon. Each unlocking command corresponds to an input or combination of inputs (provided by the user to the computing device using the user interface) required to be provided by a user of the computing device in order to access applications on a black list and/or to exit one or more applications on a white-list. Thus, the unlocking commands could comprise any combination of commands enabled by any available input device of the user interface.

In block 202, the owner may further configure a list of applications that are made accessible to any user (hereinafter a "white list"), a list of applications that are to be made accessible only to the owner (hereinafter a "black list") or both. It will be appreciated that by configuring only the white list, a black list is implicitly configured comprising all other applications, and vice versa.

In further embodiments, the owner may configure a plurality of white lists and/or blacklists corresponding to different other users (hereinafter, each a "guest"). Thus, each guest, or groups of guests, may be granted access to different applications via different whitelists. Recognizing which guest is given access to a particular whitelist could be made, for example, by the owner manually providing this information to the device via the user interface, by a face recognition function of the camera and operating system, or by determining that the guest has accessed an application which is only on one of the whitelists.

The unlocking command may comprise, for example, a password (combination of one or more keyboard entries), gesture or gesture combination, movement of the device recognizable using the accelerometer and/or gyroscope, use of a specific physical button or switch, face recognition via camera capture, voice command via the microphone, pattern unlock, or any other unlocking method now known or hereinafter devised.

The user interface may, but need not, provide a particular interface (i.e., display) during a user's attempted application unlocking. The user interface may have a particular command, executed by pressing a button for example, enabling the user to provide such an attempted application unlock, or the device may continually check for the start of the unlock command with little to no computation. In an example, this may be achieved by either breaking the unlock command down into small "time boxed" pieces (e.g., first second of the song starts with a specific tone) or into small "2D/3D spacial" pieces (e.g., top right corner of the picture being used to unlock has a specific pattern). Combinations of the foregoing are also possible.

In block 204, the unlock application monitors the inputs for the unlock command. In some examples, one or more commands may be used for unlocking (user may not be limited to a specific unlock command itself). This would enable a user to either unlock "hierarchically" (command A unlocks applications X and Y, whereas command B unlocks entire device) or use built-in capabilities of the application in use to silently blend-in the unlocking command (an application interacting with speaker/microphone of the device may unlock using verbal command, whereas a touch screen application requiring user's touch inputs may unlock using gesture on the screen). Have one or more unlock mechanisms per unlock hierarchy allows the operating system to conserve computation as the device would not be required to keep non-application required input channels open to accept unlock commands. As mentioned above, for an unlock command which supports both touch gesture and voice command, a microphone need not be open to accept input when, for example, the application being used by the guest does not support voice commands. Hence the unlocking may be configurable to intelligently adapt to the application being used. Note that in some cases when none of the unlock command configuration mechanisms are being utilized by the application in use, then a device would be required to monitor at least one of the inputs.

The use of inputs which are being monitored may be configurable by the owner. The options could vary from auto adoption based on the locked application inputs to setting up all or specified input channels to default input channel, should none of the channels are used by the application in locked state.

The owner may further configure a switching setting pursuant to which the guest must provide an unlocking command to switch between applications on the white list. If the setting is inactive, for example, the guest may be only able to access one application on the white list (i.e., and not others on the white list) unless she provides the unlocking command, while if the setting is active the guest can switch freely between the plurality of white list applications without providing the unlocking command.

If the switching setting is inactive and the application user attempts to access a command to leave the application or launch another application, preferably no feedback is given to the user. In other words, the command does not cause any particular function to be visible to the user. Thus the user must simply have prior knowledge that the unlocking command can be entered and must know what the unlocking command is, in order to perform the desired action.

In an alternate embodiment, the command causes feedback to be given to the user by a visual or audible prompt, notifying the user that the unlocking command is required to perform the desired action.

In block 206, once the unlocking command has been provided, the user may be provided access to applications on the blacklist. Preferably, once the user has re-accessed a whitelist application (which, to access the whitelist application from a blacklist application generally would not require the unlocking command), the blacklist applications again become inaccessible without the unlocking command.

In further embodiments, the unlocking command could be provided at the application level.

Although the invention has been described with reference to certain specific embodiments, various modifications thereof will be apparent to those skilled in the art without departing from the spirit and scope of the invention as outlined in the claims appended hereto. The entire disclosures of all references recited above are incorporated herein by reference.

I claim:

1. A system for limiting access to a computer application on a computing device, the system comprising:
  a) a processor;
  b) one or more input devices; and
  c) a memory linked to the processor, the memory having computer executable instructions stored thereupon which when executed by the processor cause the processor to execute:
    (i) an operating system;
    (ii) one or more computer applications; and
    (iii) an unlocking application, the unlocking application being configurable with a plurality of unlocking commands each comprising a sequence of inputs received by the input devices, the unlocking application comprising a plurality of configurable whitelists each associated with a different user of the computing device, each whitelist comprising at least one of the computer applications and associated with one of the plurality of unlocking commands, and wherein the unlocking application limits access to the one or more computer applications by requiring each one of the different users of the computing device to provide one of the unlocking commands using the input devices to access the at least one computer application in the whitelist associated with that unlocking command, wherein the unlocking application automatically adapts the unlocking commands to comprise only inputs from input devices in use by a particular one of the computer applications in use.

2. The system of claim 1, wherein the computing device is a mobile device, one of the input devices is a touchscreen, and the plurality of unlocking commands comprises inputs received by the touchscreen.

3. The system of claim 1, wherein each whitelist further comprises at least one function of the computing device and wherein the unlocking application further limits access to at least one function of the computing device.

4. The system of claim 1, wherein the one or more input devices comprise one or more of: physical buttons, switches, virtual buttons, a virtual keyboard, a camera, a microphone, an accelerometer and a gyroscope.

5. The system of claim 1, wherein the plurality of unlocking command are an operating system-level command configured by an owner or administrator of the computing device.

6. The system of claim 1, wherein each of the whitelists comprises a different one of the computer applications.

7. The system of claim 1, wherein the unlocking application further comprising one or more configurable blacklists each associated with one of the different users of the computing device, each blacklist comprising at least one of the computer applications.

8. The system of claim 1, wherein the unlocking application monitors the input devices for a beginning of one of the unlocking commands to minimize computation.

9. A method for limiting access to one or more computer application on a computing device, the method comprising defining a plurality of unlocking commands each comprising a sequence of inputs received by one or more input devices of the computing device, each unlocking command associated with one of a plurality of configurable whitelists and one of a plurality of different users of the one or more computer applications of the computing device; limiting access to the one or more computer applications of the computing device by requiring each one of the different users of the computing device to provide one of the unlocking commands using the input devices to access the at least one computer application in the whitelist associated with that unlocking command; and automatically adapting the plurality of unlocking commands to comprise only inputs from input devices in use by a particular one of the computer applications in use.

10. The method of claim 9, wherein the computing device is a mobile device, one of the input devices is a touchscreen, and the plurality of unlocking command comprises inputs received by the touchscreen.

11. The method of claim 9, wherein each whitelist further comprises at least one function of the computing device and wherein limiting access to the one or more computer applications further comprises limiting access to the at least one function of the computing device.

12. The method of claim 9, wherein the one or more input devices comprise one or more of: physical buttons, switches, virtual buttons, a virtual keyboard, a camera, a microphone, an accelerometer and a gyroscope.

13. The method of claim 9, wherein the plurality of unlocking commands are an operating system-level command configured by a user that is an owner or administrator of the computing device.

14. The method of claim 9, wherein each of the whitelists comprises a different one of the computer applications.

15. The method of claim 9, further comprising defining one or more blacklists each associated with a different user of the computing device, each blacklist comprising at least one of the computer applications.

16. The method of claim 9, wherein the method further comprises monitoring the input devices for a beginning of one of the unlocking commands to minimize computation.

* * * * *